Sept. 29, 1942.    L. K. ACHESON    2,297,275
REFRIGERATION
Filed Feb. 10, 1941    3 Sheets-Sheet 3

INVENTOR
Louis K. Acheson
BY
Harry S. Dumars
ATTORNEY

Patented Sept. 29, 1942

2,297,275

UNITED STATES PATENT OFFICE 2,297,275

REFRIGERATION

Louis K. Acheson, North Canton, Ohio, assignor to The Hoover Company, North Canton, Ohio Application February 10, 1941, Serial No. 378,162

25 Claims. (Cl. 62—119.5)

This invention relates to refrigeration and more particularly to an absorption refrigeration apparatus of the type having a fan for circulating the inert gas in a closed circuit between the evaporator and the absorber.

In such refrigeration systems, a very small amount of gas needs to be circulated between the evaporator and the absorber and as a consequence, only a small fan need be used. It has been proposed to use centrifugal fans for this purpose but such fans operate very inefficiently when small volumes of gas are being circulated therethrough and operate at a maximum efficiency when a larger volume is being circulated therethrough. It is very difficult to design a centrifugal fan which will operate at maximum efficiency when circulating a small volume such as is normally circulated in such a refrigeration system.

It is accordingly an object of this invention to supplement the action of the centrifugal fan for circulating the inert gas between the evaporator and absorber by providing a closed local circuit whereby only a portion of the gas handled by the fan circulates through the inert gas circuit thus making it possible to operate the fan at maximum efficiency while circulating only a small volume of gas through the inert gas circuit.

In an application for Letters Patent by Curtis C. Coons and William H. Kitto, Serial No. 386,395 filed April 2, 1941 is disclosed a refrigerating apparatus to which this invention may be applied. That application shows an absorption refrigerating apparatus in which the pressure developed by a fan is used to circulate liquid refrigerant upwardly through an evaporator and to raise the absorption solution to the top of the absorber. The method disclosed in that application is effective in most cases but where the absorber is positioned a substantial distance above the solution level in the solution circuit and the evaporator extends upwardly into the food compartment, the pressure differential developed by the fan would have to be increased to a considerable extent.

It is sometimes desirable to position the absorber in a vertical position in an air flue at the rear of the food storage compartment to increase the amount of air circulating thereover and thus increase its efficiency. It is also sometimes desirable to provide an evaporator for cooling the food storage compartment which extends upwardly adjacent the wall of the food storage compartment to a substantial height therein. In such cases, it is necessary to increase the pressure differential developed by the fan in order to circulate the liquid refrigerant through the evaporator and the absorption solution to the top of the absorber. Now if a local circuit is provided for recirculating a greater volume of gas through the fan than that circulating through the inert gas circuit, this inert gas which is recirculated can be utilized to increase the pressure differential produced in the inert gas circuit.

It is therefore another object of this invention to provide an absorption refrigeration apparatus in which the absorber is positioned in a vertical air flue at the back of the cabinet appreciably above the solution level in the solution circuit, in which a portion of the evaporator extends upwardly adjacent one wall of the food compartment with a portion thereof located above the bottom of the condenser, in which the inert gas is circulated in its circuit by means of a centrifugal fan, having a local circuit for by-passing some of the gas past the inert gas circuit, to utilize this by-passed inert gas to augment the pressure differential produced in the inert gas circuit and to utilize the increased pressure differential for raising the absorption solution to the top of the absorber and to circulate liquid refrigerant upwardly through the evaporator.

If a dense inert gas such as nitrogen is used, the pressure differential produced by a centrifugal fan is considerably higher than that which can be produced when a lighter inert gas is used. If a local circuit is provided through the fan by-passing the inert gas circuit and this by-passed gas used to augment the action of the fan, the pressure differential can be still further increased so that a sufficient pressure differential may be obtained to circulate the liquid refrigerant and the absorption solution to a considerable height.

It is therefore another object of this invention to provide an absorption refrigerating apparatus using a dense inert gas and a centrifugal fan to circulate the gas, in which a portion of the gas is recirculated in a local circuit through the fan and is passed through a venturi or jet pump to increase the pressure differential produced and to utilize this pressure differential to circulate the liquid refrigerant and absorption solution to heights heretofore not considered feasible.

It has been proposed to construct a refrigerating apparatus having a high temperature food storage compartment and a low temperature compartment for freezing ice. This is quite difficult to accomplish when an absorption refrigerating apparatus of the pressure equalized type is utilized since in such apparatus the proper circulation of the mediums is difficult to obtain. By using a power-driven circulator unit for the inert gas to raise the pressure in the inert gas circuit above that normally prevailing in the evaporator, and utilizing this raised pressure to circulate the refrigerant through the evaporator it is possible to construct a refrigerating apparatus having a two temperature cabinet with the ice freezing compartment below the food storage compartment.

It is therefore another object of this invention to provide a two temperature refrigerator with the ice freezing compartment below the food storage compartment, in which a power-driven circulator unit is utilized to raise the pressure in the inert gas circuit above that normally prevailing in the evaporator and to utilize this raised pressure to circulate the liquid refrigerant horizontally through the ice freezing coil of the evaporator positioned in a lower ice freezing compartment and then upwardly through a box cooling coil positioned in an upper food storage compartment.

In an absorption refrigerating apparatus of the type using an inert gas, if the warm liquid refrigerant from the condenser enters the evaporator simultaneously with the lean inert gas refrigerant vapor mixture from the absorber, it is possible to get a much lower temperature in that portion of the evaporator where the inert gas and liquid refrigerant enter the evaporator than in the portion of the evaporator where the comparatively rich inert gas refrigerant vapor mixture leaves the evaporator. This comes about because of the fact that the warm liquid refrigerant entering the evaporator will evaporate into the lean inert gas refrigerant vapor mixture with much more intensity than the cold refrigerant will evaporate into the cold rich inert gas refrigerant vapor mixture leaving the evaporator.

It is therefore another object of this invention to provide a two temperature refrigerator in which the lean inert gas refrigerant vapor mixture from the absorber enters the lower portion of the evaporator positioned in the ice freezing compartment, simultaneously with the liquid refrigerant whereby intense evaporation takes place in the lower portion of the evaporator to produce extremely low temperature in the ice freezing compartment and to circulate the cold refrigerant and the comparatively rich inert gas refrigerant vapor mixture from the lower portion of the evaporator upwardly through an upwardly extending coil positioned in the food storage compartment, whereby a less intense evaporation will take place in the upper portion of the evaporator, and the food storage compartment will consequently be maintained at a temperature above that of the ice freezing compartment.

Other objects and advantages of this invention will become apparent as the description proceeds when taken in connection with the accompanying drawings in which.

Figure 1:
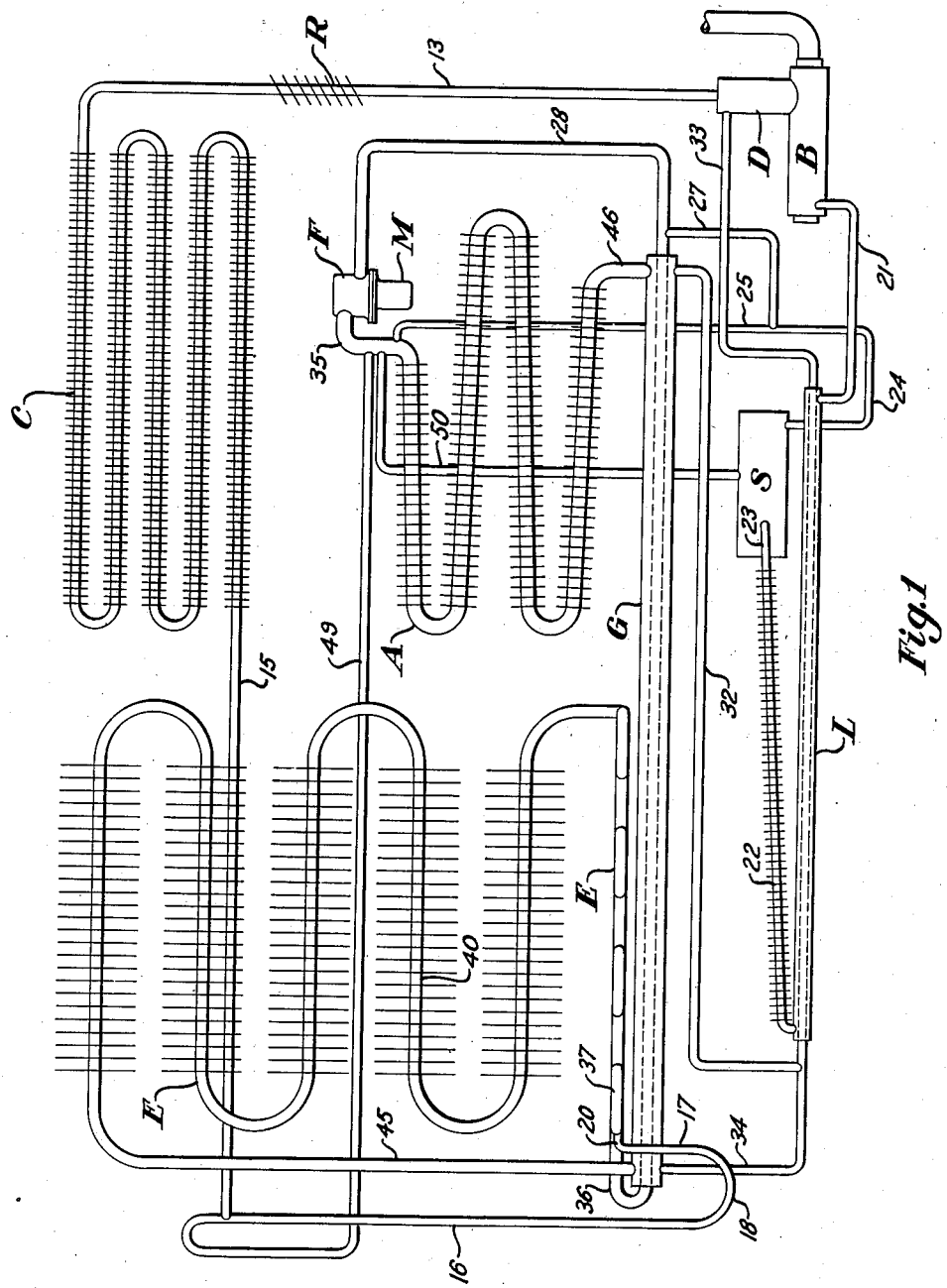
Figure 1 is a diagrammatic representation of an absorption refrigerating apparatus with this invention applied thereto.

Referring to Figure 1 of the drawings, there is disclosed a three-fluid absorption refrigerating system comprising a boiler B, an analyzer D, an air-cooled rectifier R, a tubular air-cooled vertically positioned condenser C, an evaporator E, a gas heat exchanger G, a tubular air-cooled absorber A, a solution reservoir S, a liquid heat exchanger L, and a circulating fan F which is driven by an electrical motor M. The above described elements are interconnected by various conduits to form a plurality of gas and liquid circuits constituting a complete refrigerating system to which reference will be made in more detail hereinafter.

The refrigeration system will be charged with a suitable refrigerant, such as ammonia; a suitable absorbent, such as water, and a dense inert pressure equalizing medium, such as nitrogen.

The boiler B will be heated in any suitable manner as by an electric cartridge heater or by a gas burner as may be desired.

The application of heat to the boiler B liberates refrigerant vapor from the strong solution therein. The vapor so liberated passes upwardly through an analyzer D in counterflow relationship to a strong solution flowing downwardly through the analyzer. Further refrigerant vapor is generated in the analyzer by the heat of condensation of absorption solution vapor generated in the boiler. The refrigerant vapor is conducted from the upper portion of the analyzer D to the upper portion of the condenser C through a conduit 13 which includes the air cooled rectifier R wherein any vapor of absorption solution passing through the analyzer is condensed and returned to the analyzer through the conduit 13. The refrigerant vapor is liquefied in the condenser by heat exchange relation with atmospheric air and is discharged from the bottom portion thereof through a conduit 15 into a downwardly extending conduit 16. The bottom portion of the conduit 16 connects with the bottom portion of an upwardly extending conduit 17 through a U bend 18. The conduit 16 is longer than the conduit 17 for a purpose to be described later. The conduit 17 opens at its upper end into a conduit 20 which discharges into the evaporator in a manner to be more fully described later.

The weak solution formed in the boiler by the generation of refrigerant vapor therefrom is conveyed from the boiler through a conduit 21, the outer pass of liquid heat exchanger L, an air cooled precooler 22 and a conduit 23 into the solution reservoir S. The weak solution is conveyed from the solution reservoir S through a U shaped conduit 24 which opens into the gas lift pump 25 which in turn discharges into the upper portion of the absorber A. It is apparent that the top of the absorber A is materially above the solution level normally prevailing in the boiler-analyzer-reservoir system whereby some means must be provided to elevate the absorption solution into the top of the absorber A. For this purpose a small bleed conduit 27 is connected to the discharge conduit 28 of the circulating fan F and opens into the gas lift pump 25 sufficiently below the solution level normally prevailing in the reservoir to insure that the weak solution is elevated into the top of the absorber by gas lift action.

In the absorber, the weak solution flows downwardly by gravity in counterflow relation through the rich pressure equalizing medium refrigerant vapor mixture flowing upwardly therethrough. The refrigerant vapor content of the mixture is absorbed in the absorption solution and the heat of absorption is conducted to the surrounding air by air-cooling fins which are mounted on the exterior of the absorber vessel. The strong solution formed in the absorber flows into a conduit 32 which opens into the inner pass of the liquid heat exchanger L. From the inner pass of the liquid heat exchanger L, the strong solution is conveyed to the upper portion of the analyzer D by a strong solution return pipe 33. Any solution that may find its way to the lefthand end of gas heat exchanger G will flow by conduit 34, the inner pass of liquid heat exchanger L and conduit 33 back to the analyzer.

The lean pressure equalizing medium refrigerant vapor mixture formed in the absorber A is taken from the upper portion thereof through the conduit 35 into the suction side of the circulating fan F in which it is placed under pressure and discharged through the conduit 28 into the inner pass of gas heat exchanger G. The pressure equalizing medium under pressure is conveyed from the inner pass of the gas heat exchanger G through the conduit 36 into the bottom coil 37 of the evaporator E.

The liquid refrigerant conduit 20 opens into the bottom coil 37 of the evaporator at substantially the same point as the conduit 36 whereby the liquid refrigerant supplied to the evaporator enters the same simultaneously with the pressure equalizing medium which is placed under pressure by the circulating fan F. The conduit 37 which forms the lower coil of the evaporator is of relatively small diameter whereby the pressure equalizing medium flows therethrough at a comparatively high velocity. The rapidly flowing pressure equalizing medium sweeps or drags the liquid refrigerant with it through the conduit 37 forming the horizontal coil of the evaporator into the box cooling coil 40 as the refrigerant is evaporating to produce refrigeration by diffusion into the inert medium. The box cooling conduit 40 is also of relatively small diameter whereby the rapidly flowing inert gas refrigerant vapor mixture will sweep or drag the liquid refrigerant upwardly through the plurality of lifts of the coil 40 as the remaining liquid refrigerant evaporates into the comparatively rich inert gas refrigerant vapor mixture flowing therethrough.

The comparatively warm liquid refrigerant entering the lower coil 37 of the evaporator will diffuse rapidly into the lean inert gas refrigerant vapor mixture entering from the absorber and thereby produce an extremely low temperature in the bottom coil 37. By the time the liquid refrigerant and inert gas refrigerant vapor mixture has reached the box cooling coil 40, both the liquid refrigerant and inert gas refrigerant vapor mixture has become cold and the inert gas refrigerant vapor mixture has become comparatively rich whereby the diffusion of the liquid refrigerant into the inert gas refrigerant vapor mixture will proceed at a comparatively slow rate. Thus less refrigeration will be produced in the box cooling coil 40 than in the lower coil 37 and the box cooling coil 40 will be maintained at a temperature appreciably above that of the lower coil 37.

The rich inert gas refrigerant vapor mixture formed in the evaporator is conducted therefrom into the outer pass of the gas exchanger G through a conduit 45. The opposite end of the outer pass of the gas heat exchanger G communicates with the bottom portion of the absorber A through a conduit 46. In the absorber A, the rich inert gas refrigerant vapor mixture flows upwardly in counterflow to absorption solution which absorbs the refrigerant vapor content of the mixture.

Any refrigerant unevaporated in the evaporator E will flow through the conduit 45 and conduit 34 back to the absorption solution circuit.

The conduit 16 is made longer than the conduit 17 so as to form a pressure equalizing column of liquid to prevent the pressure built up by the fan F from being blown back through the condenser C. Any liquid refrigerant which remains in the evaporator E when the system shuts down will drain through conduit 36, the inner pass of the gas heat exchanger G and bleed conduit 27 back to the solution circuit.

The discharge conduit 15 of the condenser is vented by a vent conduit 49, and the solution reservoir S is vented by a vent conduit 50 to the suction conduit 35 leading to the suction side of the fan F.

Figure 2:
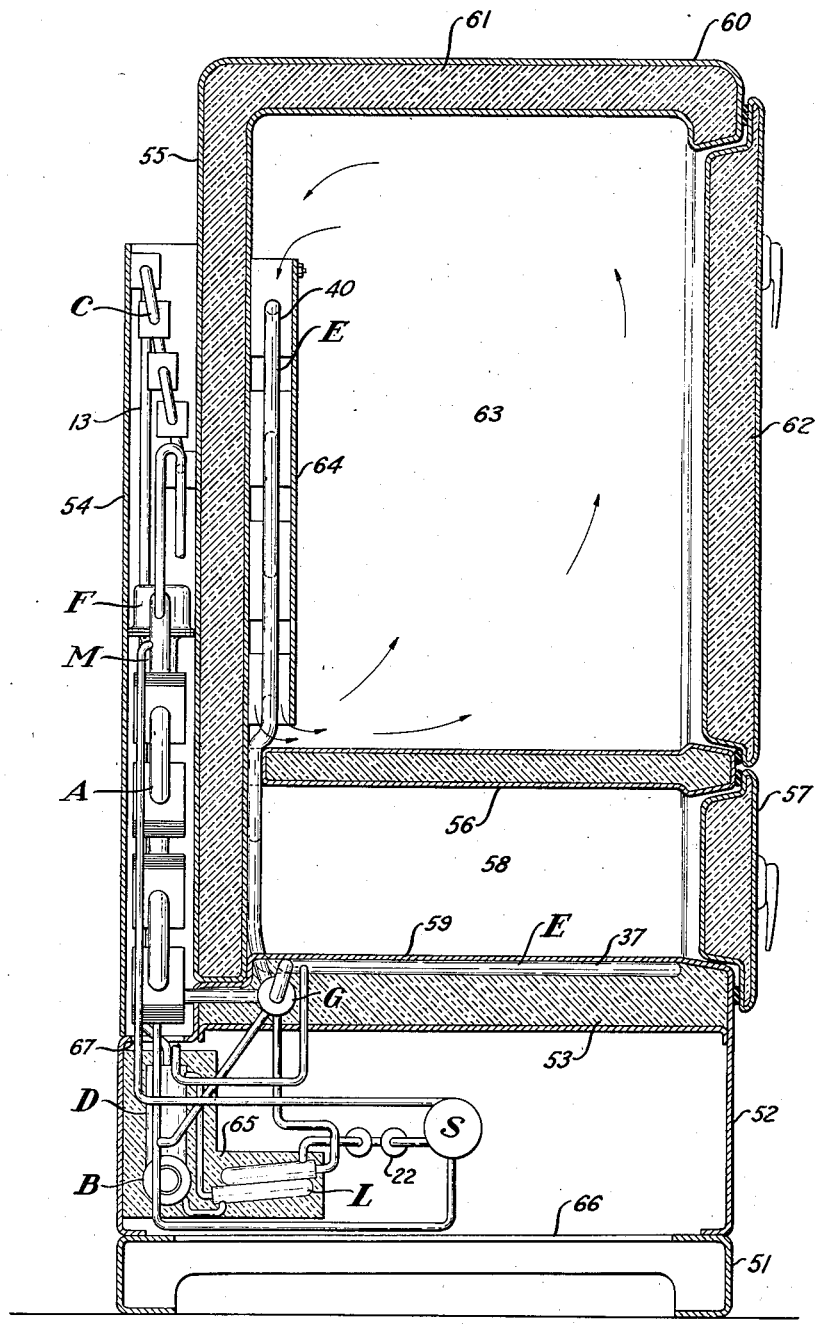
Figure 2 depicts the absorption refrigerating apparatus of Figure 1 applied to a two temperature household refrigerator cabinet.

The absorption refrigerating apparatus of Figure 1 is intended to be associated with a two-temperature cabinet such as shown in Figure 2. The refrigerating apparatus is mounted upon a suitable framework comprising a base 51, a casing 52, forming a lower apparatus compartment and having a top insulated wall 53 which separates the apparatus compartment from the interior of the cabinet, and a channel shaped member 54 which in co-operation with the rear wall 55 of the cabinet proper, forms an air flue at the rear of the cabinet. An insulating partition 56 is positioned a suitable distance above the insulated wall 53 and is supported therefrom by insulated side walls (not shown). These side walls, partition 56, insulated wall 53, access door 57 and the lower portion of the rear wall 55 of the cabinet proper form an insulated enclosure 58 for use as a low temperature compartment for freezing ice. The insulated wall 53 includes a metallic lining 59 for the enclosure 58. The coil 37 of the evaporator E is positioned immediately below this lining in heat exchange relationship therewith.

The cabinet proper indicated generally by reference numeral 60 comprises the back wall 55, top insulated wall 61, side insulated walls (not shown) and main access door 62, which together with the partition 56 form a high temperature food storage compartment 63. The side insulated walls of the cabinet proper (not shown) extend downwardly to the partition 53. The box cooling coil 40 of the evaporator E extends upwardly from the horizontal coil 37 above the partition 56 into the food storage compartment 63 and has an air flue 64 surrounding it to increase the convection air circulation thereover as shown by the arrows of Figure 2.

The insulated wall 53, the casing 52, base 51 and channel member 54 are assembled as a unit, with the gas heat exchanger G and lower evaporator coil 37 embedded in the insulated partition 53 and the box-cooling coil 40 extending upwardly, after which the cabinet proper 60 may be assembled from above with the box cooling coil 40 extending upwardly into the food storage compartment 63. The partition 56 is then inserted and the air flue 64 suitably assembled to the exterior of the cabinet.

As shown, the boiler analyzer liquid heat exchanger assembly is embedded in insulating material 65. The base 51 is open at the bottom as shown in 66, the casing 52 has an opening 67 therein and the channel member 54 is open at the top to provide for the circulation of air over the heat rejecting parts of the apparatus. The boiler analyzer liquid heat exchanger assembly is positioned along one side of the apparatus compartment to allow for the free circulation of air through the opening 67.

When the machine is in operation, the air enters through the opening 66 in the base 51, flows upwardly over the pre-cooler 22, through the opening 67, over the coils of the absorber A, is heated by the heat of absorption rejected by the fins on the absorber tubes, flows upwardly through the flue formed by the channel member 54 and the back wall 55 of the cabinet, over the condenser C, where it is further heated by the heat of condensation and is further expanded. This expansion increases the chimney effect and thus increases the rate of air circulation over the heat rejecting parts of the apparatus.

As previously explained, a comparatively intense evaporation of refrigerant into the lean inert gas refrigerant vapor mixture, takes place in the lower horizontal coil 37 of the evaporator E and as a consequence, reduces the temperature of the compartment 58 to such extent that water or other material placed on the liner 59 may be frozen or kept in a frozen condition. By the time the refrigerant and the inert gas refrigerant vapor mixture reaches the box cooling coil 40, there is a comparatively slow evaporation of refrigerant into the comparatively rich inert gas refrigerant vapor mixture and accordingly the temperature of the food compartment 63 will be maintained at a temperature appreciably higher than that of the compartment 58. By a proper design of the relative size of the coils 37 and 40 and a proper regulation of the quantity of liquid refrigerant supplies to the evaporator E almost the entire amount of refrigerant supply will be evaporated in the freezing coil 37, leaving only a small amount to be evaporated in the box cooling coil 40. In this way, the temperature of the box cooling coil 40 can be maintained above the freezing point of water and thus prevent the collection of frost thereon and at the same time supply adequate refrigerant for ice freezing purposes in the coil 37.

The energization of the apparatus may be controlled by a thermostat position in the compartment 63 or on the coil 40 so that the temperature in the compartment 63 will be maintained substantially constant. There will still be sufficient capacity for ice freezing purposes since when a high load is placed on the coil 37, coil 40 immediately rises in temperature because all of the refrigerant is being evaporated in the coil 37 and no refrigerant will be supplied to the coil 40. The apparatus will continue to operate until the load on the coil 37 is relieved and liquid refrigerant is again supplied to the coil 40 to reduce the temperature of the compartment 63 to the desired point.

In absorption refrigerating apparatuses of the type herein involved, with the top of the absorber positioned at an appreciable distance above the solution level and the box cooling coil extending substantially above the point of supply of liquid refrigerant to the evaporator, it is necessary to provide a considerable pressure difference in the inert gas circuit in order to raise the absorption solution and liquid refrigerant to the required height.

A centrifugal fan type circulator unit offers the least operating difficulties under the high pressure and corrosive atmosphere involved. However, this type of fan has the disadvantage that it operates at low efficiency when pumping the small quantity of gas needed. By recirculating a portion of the gas through the fan without circulating it through the inert gas circuit the efficiency of this type of fan can be raised and at the same time only a small quantity of gas can be circulated in the inert gas circuit. By passing the recirculated gas through suitable jet means the pressure differential produced in the inert gas circuit can be increased over that which can be produced by such a fan alone.

Figure 3:
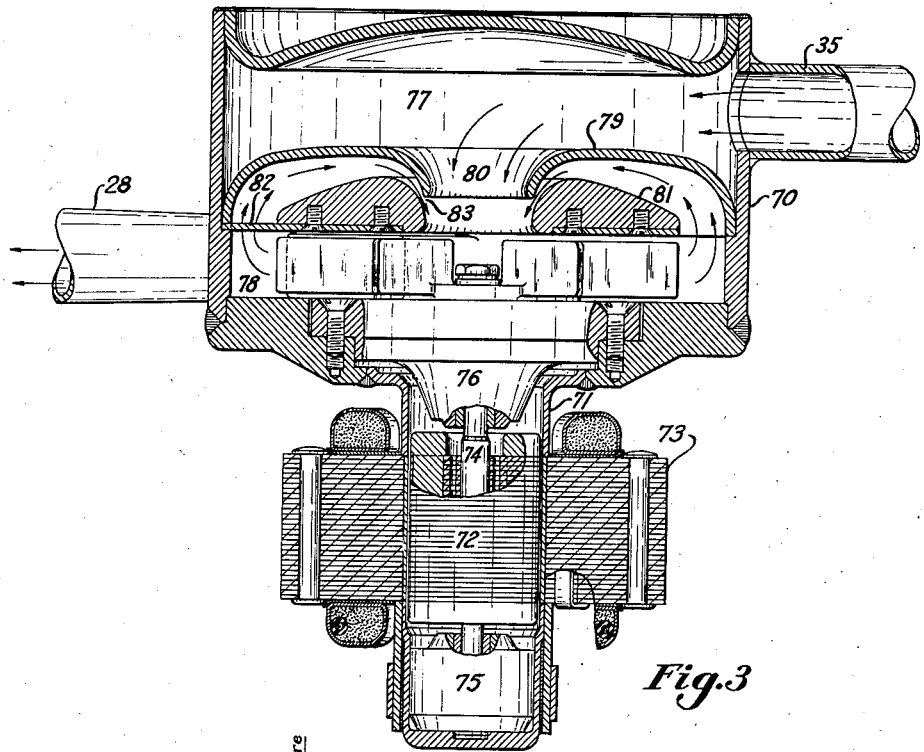
Figure 3 is a sectional view of the inert gas circulator unit according to this invention.

Figure 3 shows one method by which a centrifugal fan can be modified in the above manner to increase the efficiency of the fan, produce only a small rate of gas flow in the inert gas circuit and at the same time create a sufficient pressure differential in the inert gas circuit to circulate the absorption solution and liquid refrigerant to the required height.

The motor fan unit comprises a casing 70 for the centrifugal fan F and a shell 71 separating the motor rotor 72 and the motor stator 73. The portion of the shell 71 between the rotor and stator is made comparatively thin to reduce the effective air gap between the rotor and stator and is supported against internal pressure by the stator 73 being pressed tightly thereover. The rotor 72 is rigidly connected to the fan F by a shaft 74 which is rotatably supported on the interior of the casing by bearing assemblies 75 and 76. The bearing assemblies may be lubricated in any suitable manner such as by filling the casing 71 to a suitable level with liquid mediums normally contained within the apparatus or with any other suitable lubricant. Any suitable means may be provided for preventing the lubricant in the shell 71 from escaping to other parts of the apparatus.

The fan casing 70 is divided into a suction chamber 77 and a high pressure chamber 78 by a partition 79 having an opening 80 leading from the suction chamber 77 to the eye of the fan. The partition 79, at the opening 80 is extended downwardly to cooperate with a member 81, suitably supported in casing 70 by a spider 82, to form an annular Venturi opening 83 between the partition 79 and the member 81 at the opening 80. The partition 79 and the member 81, together with the cut-out portions of the spider 82 also form a local circuit for recirculating a portion of the gas through the fan without circulating it through the inert gas circuit.

The recirculated gas passing through annular Venturi opening 83 acts as a jet pump to augment the action of the fan F and increases the pressure differential produced in the inert gas circuit. By recirculating a portion of the gas through the fan without circulating it through the inert gas circuit, the volume of the gas handled by the fan is increased without correspondingly increasing the volume circulated in the inert gas circuit so that the efficiency of the fan can be maintained at an optimum value while circulating the required volume of gas in the inert gas circuit.

Figure 4:
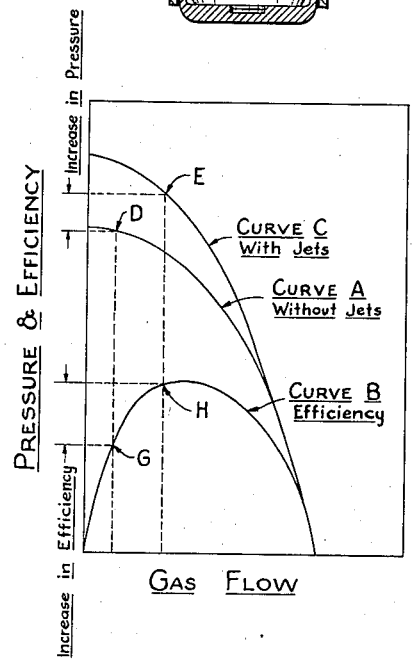
Figure 4 shows the pressure and efficiency curves of a centrifugal fan with and without the recirculated gas according to this invention, plotted against the volume of gas flow through the fan.

By referring to Figure 4 of the drawings, it can easily be seen how the recirculation of a portion of the gas through the fan and Venturi opening 83 without circulating it through the inert gas circuit produces the above results. In Figure 4, the volume of gas flow is plotted against the pressure differential produced and the efficiency of the fan F. The abscissa represents the volume of gas flow. The ordinates represent the pressure differential produced, with regard to curves A and C, and the efficiency of the fan F with regard to curve B.

Curve A is the pressure differential curve of the fan F acting alone. The abscissa at point D represents the volume of gas required to be circulated through the inert gas circuit. Curve B represents the efficiency curve for fan F. By extending the ordinate of point D downwardly until it intersects the efficiency curve B at point G, it can be seen that if the fan F were operating to produce the required flow of gas through the inert gas circuit it would be operating at a very low efficiency. By recirculating gas through the fan F, and the annular venturi 83, the pressure differential curve C is obtained. The volume of gas now being circulated through the fan F is represented by the abscissa of point E. By extending the ordinate of this point downwardly to a point where it crosses the efficiency curve B at H, it can be seen that the fan F is operating at a maximum efficiency or at an increase represented by the ordinates between the points G and H. At the same time, jet pump action produced by the recirculating gas passing through the Venturi opening 83, increases the pressure differential produced by an amount represented by the ordinates between points D and E.

It can thus be seen that by incorporating the modified fan of Figure 3 into the absorption refrigerating apparatus of Figures 1 and 2, that an efficiently operating fan is produced which will circulate the small volume of gas required and at the same time produce a pressure differential sufficient to circulate the absorption solution and the liquid refrigerant to the required height.

It can also be seen from the foregoing that by this invention it is possible to produce a domestic refrigerator of the pressure equalized absorption type having a two-temperature cabinet with the box cooling coil extending upwardly into the food storage compartment and to circulate the liquid refrigerant upwardly through the box cooling coil by means of the pressure differential produced by the gas circulating unit and to automatically maintain a temperature differential between the food storage compartment and the ice freezing compartment.

While I have shown but one embodiment of my invention, it is to be understood that this embodiment is to be taken as illustrative only and not in a limiting sense. I do not wish to be limited to the particular structure shown and described but to include all equivalent variations thereof except as limited by the scope of the claims.

I claim:

1. An absorption refrigerating apparatus comprising, an evaporator and absorber, circuits for the circulation of the mediums within the apparatus including a closed inert gas conduit between the evaporator and absorber, a fan for circulating the inert gas in its circuit, and a local closed circuit through said fan independently of said medium circuits whereby a comparatively large volume of gas is circulated through said fan and a relatively small volume of gas is circulated through the inert gas circuit.

2. In combination, an absorption refrigerating apparatus, said apparatus being charged with working mediums including a dense inert gas, circuits for the circulation of the working mediums within the apparatus, including a closed circuit for said gas, said apparatus being of the type requiring a small rate of gas flow through said gas circuit, power operated means for circulating said gas in its circuit, said power operated means including a fan of the type which operates at high efficiency at high rates of gas flow and means for recirculating a portion of said gas through said fan without circulating it through said circuits whereby a small rate of gas flow is produced in said gas circuit and the efficiency of the fan is maintained at an optimum value.

3. In combination, an absorption refrigerating apparatus, said apparatus being charged with a refrigerant and an inert gas, said apparatus including a closed circuit for said inert gas and being of the type requiring a comparatively high pressure differential between different parts of said gas circuit, and a comparatively small rate of flow of gas through said circuit, power operated means in said circuit for circulating said gas in its circuit, said power operated means including a fan of the type which operates at high efficiency at high rates of gas flow, means for recirculating a portion of said gas through said fan without circulating it through said circuit and means for utilizing said recirculated gas for increasing the pressure differential produced whereby a high pressure differential and low rate of gas flow in said circuit is maintaind and the efficiency of the fan is maintained at an optimum value.

4. An absorption refrigerating apparatus comprising, an evaporator, an absorber, a closed inert gas circuit between the evaporator and absorber, a fan for circulating the inert gas in its circuit, a closed circuit by-passing the evaporator and absorber and means in said closed by-pass circuit for increasing the pressure differential produced in said circuit.

5. The method of operating an absorption refrigerating apparatus of the type having closed circuits for the circulation of the working mediums, requiring a low rate of inert gas flow and using a circulator unit having a high efficiency at a high rate of gas flow, comprising, the step of recirculating a portion of the gas through the circulator without circulating it through the medium circuits.

6. The method of circulating the mediums of an absorption refrigerating apparatus through their circuits by means of a fan, comprising circulating a volume of gas through said fan in excess of that circulated through the medium circuits.

7. The method of operating an absorption refrigerating apparatus of the type requiring a low rate of gas flow and a high pressure differential in the gas circuit and using a gas circulator unit having a high efficiency at high rates of gas flow, comprising recirculating a portion of gas through the circulator unit without circulating it through the gas circuit and utilizing the recirculated gas to increase the pressure differential produced.

8. An absorption refrigerating apparatus comprising an evaporator, an absorber, a solution circuit in which the normal solution level is below the top of the absorber, a closed inert gas circuit between the evaporator and absorber, a circulator for circulating the inert gas in its circuit and a local circuit for recirculating a portion of the inert gas through said circulator unit without circulating it in said closed inert gas circuit, means in said local circuit for increasing the pressure differential produced by said circulator unit and means for utilizing the increased pressure differential for raising absorption solution to the top of the absorber.

9. In combination, a cabinet having a food storage compartment and an apparatus compartment including a vertically positioned air flue, an evaporator in said food storage compartment, a vertically positioned absorber in said flue, a closed inert gas circuit between said evaporator and absorber, a solution circuit including said absorber having a solution level below the top of said absorber, a circulator unit for circulating the gas in its circuit, said circulator unit being of the type which operates at high efficiency at high rates of gas flow, means for recirculating a part of said gas through said circulator unit without circulating it through said circuit, said means comprising Venturi means whereby the pressure differential produced is increased and means for using a portion of said gas at said increased pressure differential for raising absorption solution to the top of said absorber.

10. An absorption refrigerating apparatus comprising a condenser, an evaporator, an absorber, said evaporator having a portion positioned above the bottom of the condenser, a closed inert gas circuit between the evaporator and absorber, a circulator unit for circulating the inert gas in its circuit, a local circuit for recirculating a portion of the inert gas through said circulator unit without circulating it through said closed inert gas circuit, means in said local circuit for increasing the pressure differential produced by said circulator unit and means for utilizing the increased pressure differential for blowing liquid refrigerant upwardly through said evaporator.

11. An absorption refrigerating apparatus comprising, an evaporator, an absorber, a condenser, a closed inert gas circuit between said evaporator and absorber, said evaporator comprising a horizontal bank of coils and a vertical bank of coils extending upwardly therefrom, means for leading condensed refrigerant from said condenser to the inlet of said horizontal portion, a circulator unit for circulating the inert gas in its circuit, said circulator unit being of the type which operates at high efficiency with high rates of gas flow, means for recirculating a portion of said gas through said circulator unit without circulating it through said circuit, said means including a Venturi opening whereby the pressure differential produced by said circulator unit is increased, said evaporator and inert gas circuit being so constructed and arranged that the increased pressure differential produced will blow the liquid refrigerant along the horizontal bank of coils and upwardly through the vertical bank of coils while the refrigerant is evaporating by diffusion into the inert gas.

12. The method of operating absorption refrigerating apparatus of the type having the top of the absorber positioned above the solution level normally prevailing in the solution circuit and having an inert gas circulating in a closed circuit between the evaporator and absorber in which a circulator unit is utilized for circulating the inert gas, comprising, recirculating a portion of the inert gas through the circulator unit without circulating it through the inert gas circuit, utilizing the recirculated gas to increase the pressure differential produced and utilizing the increased pressure differential to raise absorption solution to the top of the absorber.

13. The method of circulating the mediums in an absorption refrigerating apparatus of the type having a closed inert gas circuit, an evaporator with a portion positioned above the condenser and a fan for circulating the inert gas comprising, circulating a greater volume of gas through the fan than through the inert gas circuit, utilizing the excess to increase the pressure differential produced and utilizing the increased pressure differential to circulate liquid refrigerant upwardly through the evaporator.

14. The method of circulating the mediums in an absorption refrigerating apparatus of the type having a closed inert gas circuit, a solution circuit, an evaporator with a portion positioned above the bottom of the condenser and a fan for circulating the inert gas comprising, circulating a greater amount of gas through the fan than through the inert gas circuit, utilizing the excess to increase the pressure differential produced and utilizing the increased pressure differential for circulating the absorption solution in its circuit and for circulating liquid refrigerant upwardly through the evaporator.

15. An absorption refrigerating apparatus comprising, an evaporator, an absorber, a condenser, a solution circuit in which the normal solution level is below the top of the absorber, a closed inert gas circuit between the evaporator and the absorber, said evaporator having a portion thereof positioned above the bottom of said condenser, a circulator unit for circulating the inert gas in its circuit, a local circuit for recirculating a portion of the inert gas through said circulator unit without circulating it through said closed inert gas circuit, means in said local circuit for increasing the pressure differential produced by said circulator unit and means for utilizing the increased pressure differential for raising absorption solution to the top of the absorber and for blowing liquid refrigerant upwardly through the evaporator.

16. The method of circulating the mediums in an absorption refrigerating apparatus of the type having a closed inert gas circuit, a solution circuit and a fan for circulating the inert gas comprising, circulating a greater volume of gas through the fan than through the inert gas circuit, utilizing the excess gas circulated through said fan over that circulating through the inert gas circuit for increasing the pressure differential produced and utilizing the increased pressure differential to circulate the solution in its circuit.

17. An absorption refrigerator apparatus, comprising a cabinet including a horizontally positioned wall and a vertically positioned wall, an evaporator associated with said cabinet, said evaporator comprising a coiled conduit having a plurality of coils positioned horizontally along said horizontal wall and a plurality of upwardly extending coils positioned adjacent said upwardly extending wall, an absorber, a condenser positioned above the lower coils of said evaporator, a closed inert gas circuit between said evaporator and absorber, a circulator unit in said circuit for raising the gas pressure in said circuit above that normally prevailing in said evaporator, means for leading condensed refrigerant from said condenser to the lower coils of said evaporator, said means and said circuit being so constructed and arranged that the gas at its raised pressure will blow the liquid refrigerant along through the horizontal coil and then upwardly through the vertically extending coil as the refrigerant is evaporating into the inert gas to produce refrigeration.

18. In combination, a refrigerating apparatus comprising a cabinet having a lower compartment and an upper compartment separated therefrom by an insulated wall, an absorption refrigerating apparatus associated with said cabinet, said apparatus comprising an inert gas circuit including an evaporator and an absorber, said evaporator including a coil of tubing positioned along the bottom wall of said lower compartment and a coil of tubing extending upwardly therefrom into said upper compartment, a condenser, a gas circulator unit in said inert gas circuit for raising the gas pressure therein above that normally prevailing in said evaporator and for circulating the inert gas from the absorber to the evaporator and back to the absorber, means for leading condensed refrigerant from said condenser to the lower coil of the evaporator, said means and said inert gas circuit being so constructed and arranged that the lean inert gas refrigerant vapor mixture from the absorber enters the lower coil of the evaporator simultaneously with the liquid refrigerant and the inert gas at its raised pressure will blow the liquid refrigerant along the lower coil of the evaporator and thence upwardly through the upper upwardly extending coil as the refrigerant is evaporating into the inert gas to produce refrigeration, whereby a relatively intense evaporation of warm refrigerant will take place into the lean inert gas refrigerant vapor mixture in the lower coil of the evaporator and a less intense evaporation of cold refrigerant will take place into the relatively richer inert gas refrigerent vapor mixture in the upwardly extending coil to maintain said lower compartment at a temperature appreciably below that of the upper compartment.

19. In combination, a refrigerating apparatus comprising a cabinet having a lower compartment and an upper compartment separated therefrom by an insulated wall, an absorption refrigerating apparatus associated with said cabinet comprising an inert gas circuit including an evaporator and an absorber, said evaporator comprising a coil of tubing positioned along the bottom wall of said lower compartment and a coil of tubing extending upwardly therefrom into said upper compartment, a condenser, a fan in said inert gas circuit, means for recirculating the portion of said gas to said fan without circulating it through said circuit, means for utilizing said recirculated gas for increasing the pressure differential produced in said circuit, means for leading liquid refrigerant from said condenser to the lower coil of said evaporator, said means and said circuit being so constructed and arranged that the lean inert gas refrigerant vapor mixture from the absorber enters the lower coil of the evaporator simultaneously with the liquid refrigerant and the inert gas at its raised pressure will blow the liquid refrigerant along the lower coil of the evaporator and thence upwardly through the upwardly extending coil.

20. In combination, an absorption refrigerating apparatus, said apparatus being charged with a refrigerant and an inert gas, said apparatus including a closed circuit for said inert gas and being of the type requiring a comparatively high pressure differential between different parts of said gas circuit and a comparatively small rate of flow of gas through said circuit, power operated means in said circuit for circulating said gas in its circuit, said power operated means including a fan of the type which operates at high efficiency at high rates of gas flow, and means for recirculating a portion of said gas through said fan without circulating it through said circuit, said recirculating means including jet means for increasing the pressure differential produced whereby a high pressure differential and low rate of gas flow in said circuit is maintained and the efficiency of the fan is maintained at an optimum value.

21. In combination, an absorption refrigerating apparatus, said apparatus being charged with a refrigerant, an absorption solution, and a dense inert gas, said apparatus comprising circuits for the circulation of the refrigerant, the solution and the inert gas and requiring only a small flow of gas in the gas circuit, power-operated means for promoting the circulation of the refrigerant, the solution and inert gas in their circuits, said power operated means including a fan of the type which operates at high efficiency, at high rates of gas flow, and means for recirculating a portion of said gas through said fan without circulating it through said circuits, whereby the efficiency of the fan is maintained at an optimum and only a small flow of gas is produced in the inert gas circuit.

22. In combination, an absorption refrigerating apparatus, said apparatus being charged with a refrigerant and a dense inert gas, said apparatus comprising circuits for the circulation of the refrigerant and the inert gas and requiring only a small flow of gas in the gas circuit, power-operated means for promoting the circulation of the refrigerant and inert gas in their circuits, said power-operated means including a fan of the type which operates at high efficiency, at high rates of gas flow, and means for recirculating a portion of said gas through said fan without circulating it through said circuits, whereby the efficiency of the fan is maintained at an optimum and only a small flow of gas is produced in the inert gas circuit.

23. In combination, a refrigerating apparatus comprising, an evaporator, a vertically positioned absorber, a closed circuit for inert gas between said evaporator and absorber, a closed circuit for absorption solution including said absorber, a motor driven circulator unit for circulating said gas in its circuit, said circulator unit being of the type which operates more efficiently at high rates of gas flow, a by-pass circuit to recirculate a portion of said gas through said circulator unit without circulating it through said circuit, Venturi means in said by-pass circuit whereby the pressure differential produced is increased and means for using a portion of said gas at said increased pressure differential to raise absorption solution to the upper end of said absorber.

24. In combination, an absorption refrigerating apparatus comprising, a cabinet having a food storage compartment and an apparatus compartment, an evaporator in said food storage compartment, an absorber and condenser in said apparatus compartment, a closed inert gas circuit between said evaporator and absorber, said evaporator comprising a horizontally positioned portion and a vertically arranged portion extending upwardly therefrom, means for leading condensed refrigerant from the condenser to the inlet of said horizontal portion, a circulator unit for circulating the inert gas in its circuit, said circulator unit being of the type which operates at high efficiency at high rates of gas flow, a by-pass circuit for recirculating a portion of said gas through said circulator unit without circulating it through said gas circuit, Venturi means in said by-pass circuit whereby the pressure differential produced is increased, said inert gas circuit and evaporator being so constructed and arranged that the increased pressure differential produced will blow the liquid refrigerant along the horizontal portion of said evaporator and upwardly through said vertical portion while the refrigerant is evaporating by diffusion into said inert gas.

25. An absorption refrigerating apparatus comprising, an evaporator, an absorber, an inert gas circuit between said evaporator and absorber, a fan for circulating the inert gas in its circuit, a closed circuit by-passing the evaporator and absorber and Venturi means in said closed by-pass circuit for increasing the pressure differential produced in said circuit.

LOUIS K. ACHESON.

CERTIFICATE OF CORRECTION.

Patent No. 2,297,275. September 29, 1942.

LOUIS K. ACHESON.

It is hereby certified that error appears in the printed specification of the above numbered patent requiring correction as follows: Page 4, first column, line 42, for "supplies" read --supplied--; line 52, for "position" read --positioned--; page 5, first column, line 64, claim 1, for "conduit" read --circuit--; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.